United States Patent
Du et al.

(10) Patent No.: US 10,936,338 B1
(45) Date of Patent: Mar. 2, 2021

(54) METHOD AND SYSTEM FOR PROCESSING DATA USING A STACKABLE AND SCALABLE DATA PROXY (SSDP)

(71) Applicant: Dell Products L.P., Hopkinton, MA (US)

(72) Inventors: Lejin Du, Kanata (CA); Oleg Koshelnikov, Ottawa (CA); Oleksandr Babiychuk, Ottawa (CA); Mikhail Karasik, Nepean (CA); James Alexander Scott, Ottawa (CA); Yuri Berfeld, Ottawa (CA)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/554,604

(22) Filed: Aug. 28, 2019

(51) Int. Cl.
*G06F 3/00* (2006.01)
*G06F 9/445* (2018.01)

(52) U.S. Cl.
CPC ................ *G06F 9/44526* (2013.01)

(58) Field of Classification Search
CPC ........................................................... G06F 9/54
USPC ............................................................ 719/310
See application file for complete search history.

(56) References Cited

U.S. PATENT DOCUMENTS

| | | | |
|---|---|---|---|
| 2007/0174469 A1* | 7/2007 | Andress | H04L 63/08 709/227 |
| 2013/0238562 A1* | 9/2013 | Kumarasamy | G06F 9/45558 707/649 |
| 2015/0334159 A1* | 11/2015 | Li | H04L 67/02 709/203 |
| 2018/0084087 A1* | 3/2018 | Devlin | G06F 8/61 |

OTHER PUBLICATIONS

Qingji Zheng, Improved Anonymous Proxy Re-encryption with CCA Security. (Year: 2014).*
Yu et al., "Container Storage Interface (CSI)", Retrieved from https://github.com/container-storage-interface/spec/blob/release-1.1/spec.md, Mar. 7, 2019 (78 pages).

* cited by examiner

*Primary Examiner* — Lechi Truong
(74) *Attorney, Agent, or Firm* — Chamberlain, Hrdlicka, White, Williams & Aughtry

(57) ABSTRACT

In general, embodiments of the invention relate to processing data from (or associated with) containerized applications using a scalable processing infrastructure. More specifically, embodiments of the invention implement stackable scalable data proxy (SSDP) clients, each of which includes one or more proxy functions. The proxy functions are used to process the data. The processing may include, but is not limited to, modifying the data and/or analyzing the data and then taking an action(s) based on the analysis.

17 Claims, 9 Drawing Sheets

US 10,936,338 B1

METHOD AND SYSTEM FOR PROCESSING DATA USING A STACKABLE AND SCALABLE DATA PROXY (SSDP)

BACKGROUND

Applications are often deployed using container-based technologies. The container-based technologies typically include proprietary implementations, which require customized solutions to be developed on a per-container technology basis.

SUMMARY

In general, in one aspect, the invention relates to, a method for processing data. The method includes receiving, via a unified data interface, a request from a containerized application, determining an identifier associated with the request, processing the request using at least one proxy function to generate an output, and transmitting, via an interface plugin, the output to a storage device, wherein the storage device is associated with the identifier.

In general, in one aspect, the invention relates to, a non-transitory computer readable medium (CRM) storing instructions, which when executed by at least one processor performs a method, the method comprises receiving, via a unified data interface, a request from a containerized application, determining an identifier associated with the request, processing the request using at least one proxy function to generate an output, and transmitting, via an interface plugin, the output to a storage device, wherein the storage device is associated with the identifier.

Other aspects of the invention will be apparent from the following description and the appended claims.

DETAILED DESCRIPTION

Figure 1A:
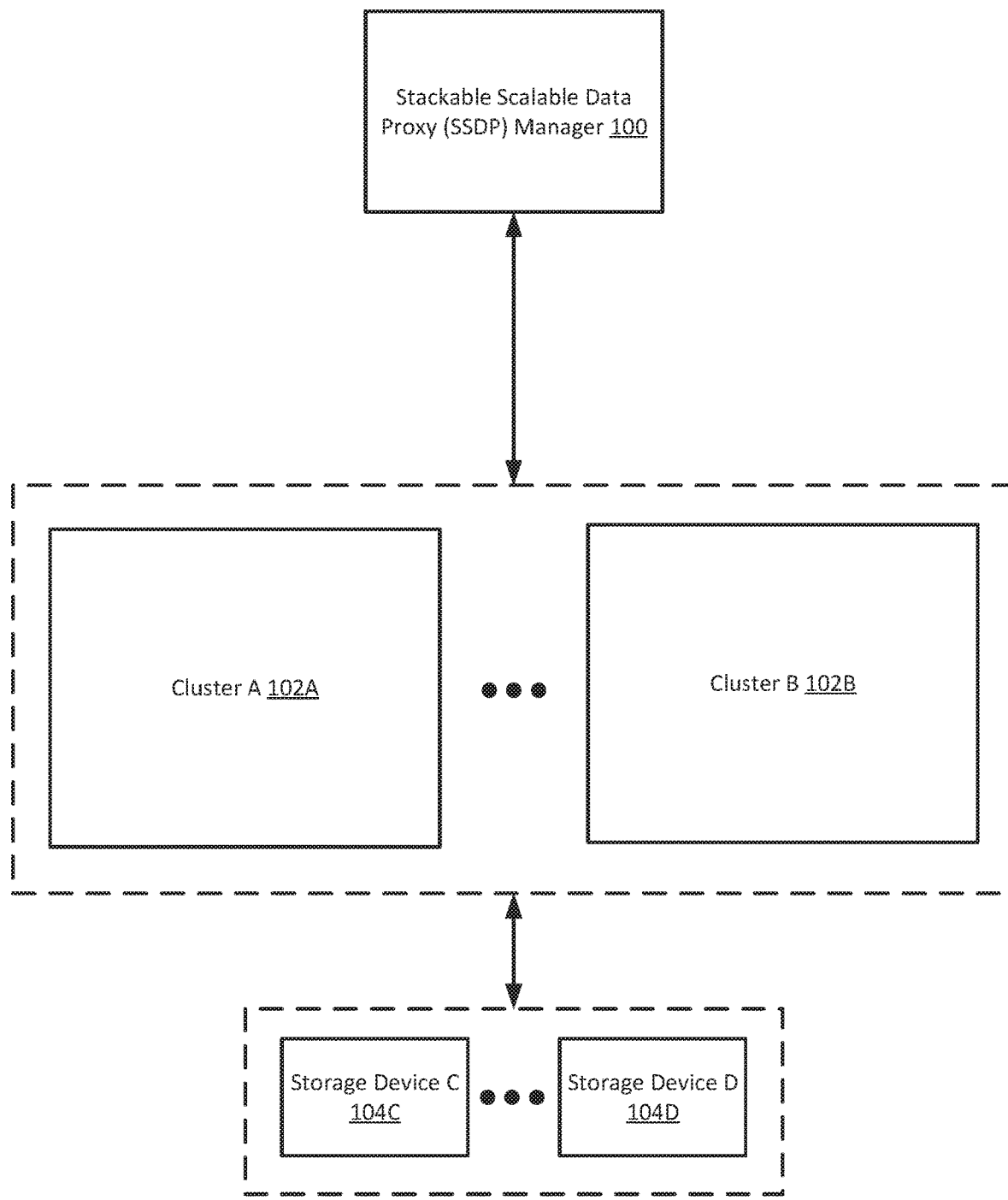
FIG. 1A shows a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to processing data from (or associated with) containerized applications using a scalable processing infrastructure. More specifically, embodiments of the invention implement stackable scalable data proxy (SSDP) clients, each of which includes one or more proxy functions. The proxy functions are used to process the data. The processing may include, but is not limited to, modifying the data and/or analyzing the data and then taking an action(s) based on the analysis. The SSDP clients are implemented such that can be connected vertically (see e.g., FIG. 2B) and/or horizontally (see e.g., FIG. 2A) in order to process the data. Further, the SSDP clients are configured to interface with underlying storage devices using, e.g., the Container Storage Interface (CSI) specification. Said another way, the SSDP clients are interposed between storage device specific interface plug-ins (which may be CSI specification compliant or otherwise support the CSI specification) and the containerized applications such that the data from the containerized applications may be processed using any combination of SSDP clients without requiring the containerized application and/or the interface plug-ins to be modified (or only requiring minimal modification to interface with the SSDP clients).

By using this architecture, the SSDP clients that are used to process the data from a given containerized application may be dynamically modified to add and/or remove various SSDP clients. Moreover, because the SSDP clients are external to the containerized applications and the interface plugins, the SSDP clients may be utilized by multiple different containerized applications.

FIG. 1A shows a system in accordance with one or more embodiments of the invention. The system includes a stackable scalable data proxy (SSDP) manager (100) operatively connected one or more clusters (102A, 102B). The clusters (102A, 102B) are, in turn, operatively connected to one or more storage devices (104C, 104D). The aforementioned components may communicate using any combination of wired and/or wireless connections and wired and/or wireless networks. Each of the aforementioned components is described below.

In one or more embodiments of the invention, the SSDP manager (100) is a remote management system for the SSDP clients (not shown) that are deployed in the one or more clusters. The SSDP manager (100) includes functionality to monitor and control functions associated with one or more SSDP clients (which may be in the same and/or different clusters). For example, the SSDP manager may include data structures that map global unique identifications (GUIDs) to encryption keys (discussed below). In another example, the SSDP manager may also implement one or more policies to determine whether a given application can access data in a storage device (see e.g., FIG. 5). The SSDP manager may maintain other data structures without departing from the invention.

Figure 5:
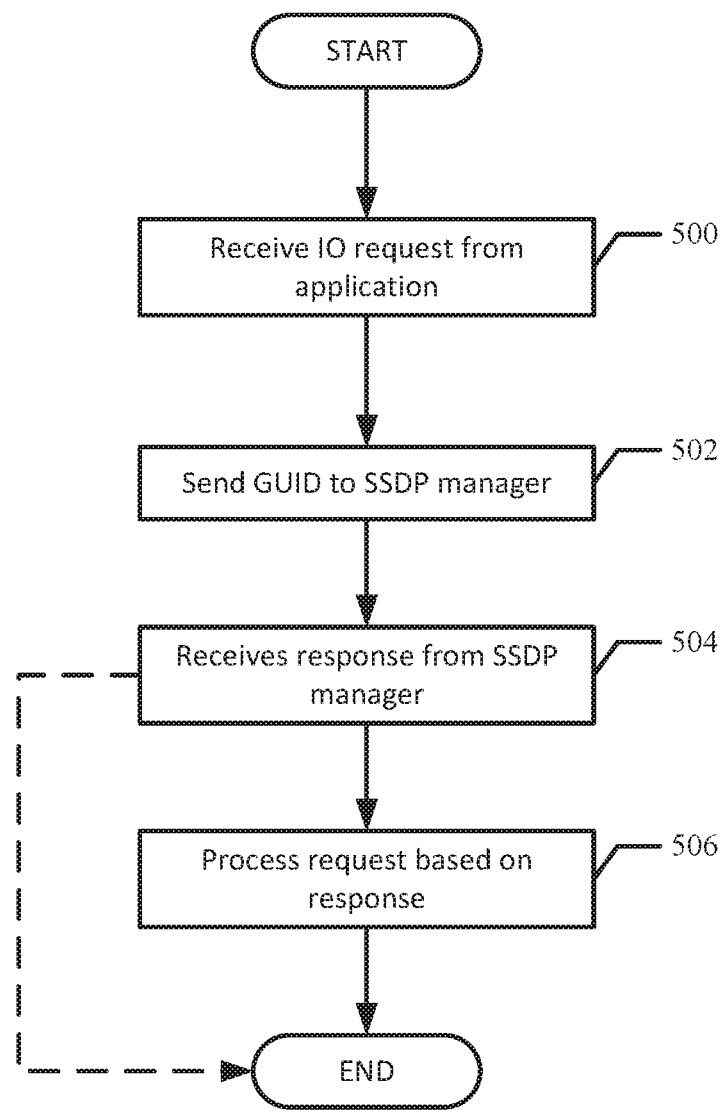
FIG. 5 shows a method in accordance with one or more embodiments of the invention.
Figure 6:
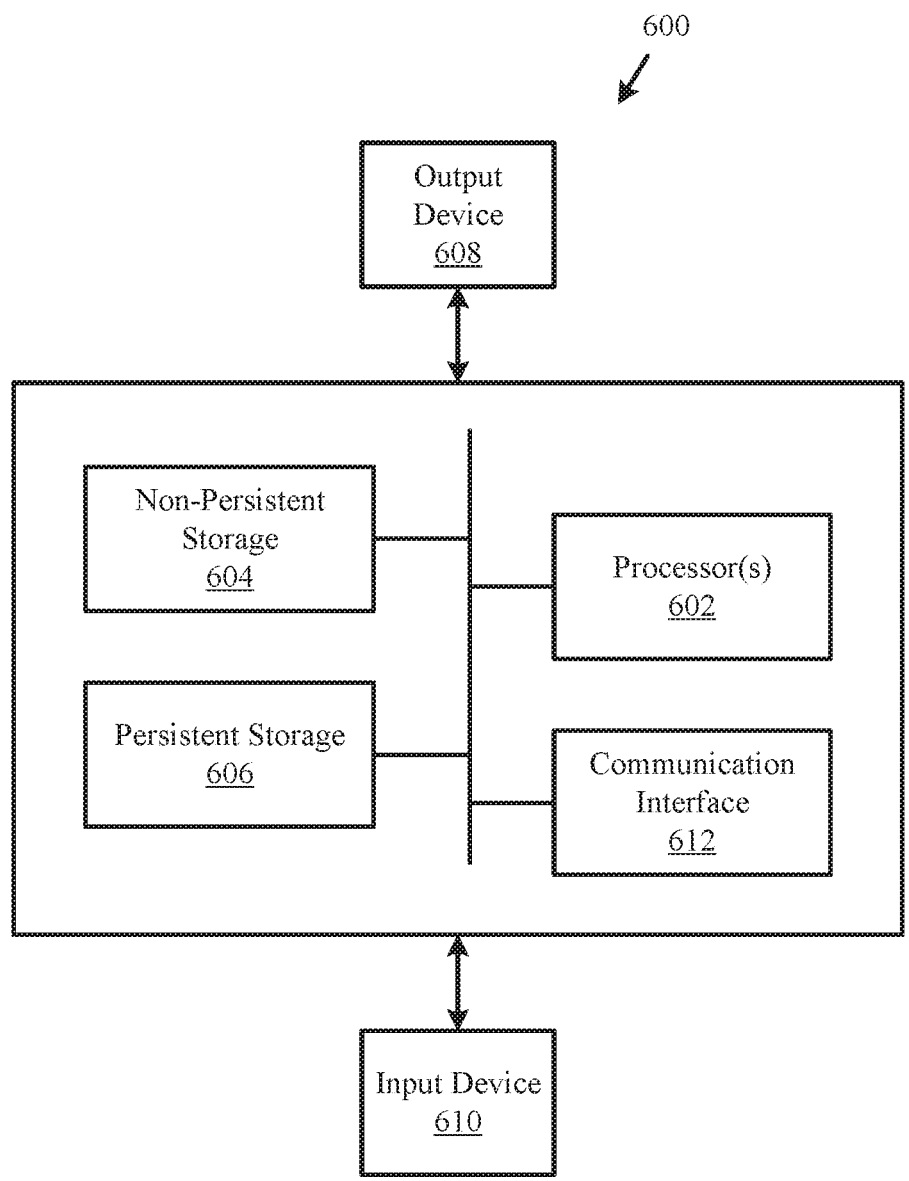
FIG. 6 shows a computing system in accordance with one or more embodiments of the invention.

In one or more embodiments of the invention, the SSDP manager (100) is implemented as a computing device (see e.g., FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a SSDP manager (100) described throughout this application (see e.g., FIGS. 3-5).

In one or more embodiments of the invention, the SSDP manager (100) may be implemented as a logical device. The logical device may utilize the computing resources of any number of computing devices and thereby provide the functionality of the SSDP manager (100) described throughout this application.

In one or more embodiments of the invention, each cluster (102A, 102B) corresponds to a logical and/or physical grouping of containerized applications (not shown), SSDP clients (not shown), and interface plugins (not shown). Each of these elements is described below with respect to FIG. 1B. The specific grouping of elements within a given cluster may vary based on the implementation of the invention.

In one embodiment of the invention, the clusters (102A, 102B) are operatively connected to one or more storage devices (104C, 104D). The storage devices may store data for one or more containerized applications. The specific data that is stored on each of the storage devices may vary based on the implementation. In one embodiment of the invention, the SSDP Manager (100) (via the SSDP clients—see e.g., FIG. 3) maintains a data structure(s) that tracks the various storage devices that are accessible by the clusters and, in some embodiments, the characteristics of each of the storage devices.

In one or more embodiments, the storage devices (104C, 104D) may include persistent storage. Persistent storage may include, but is not limited to, optical storage, magnetic storage, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM). For additional details regarding the one or more clusters (102, 104), see e.g., FIG. 1B.

Figure 1B:
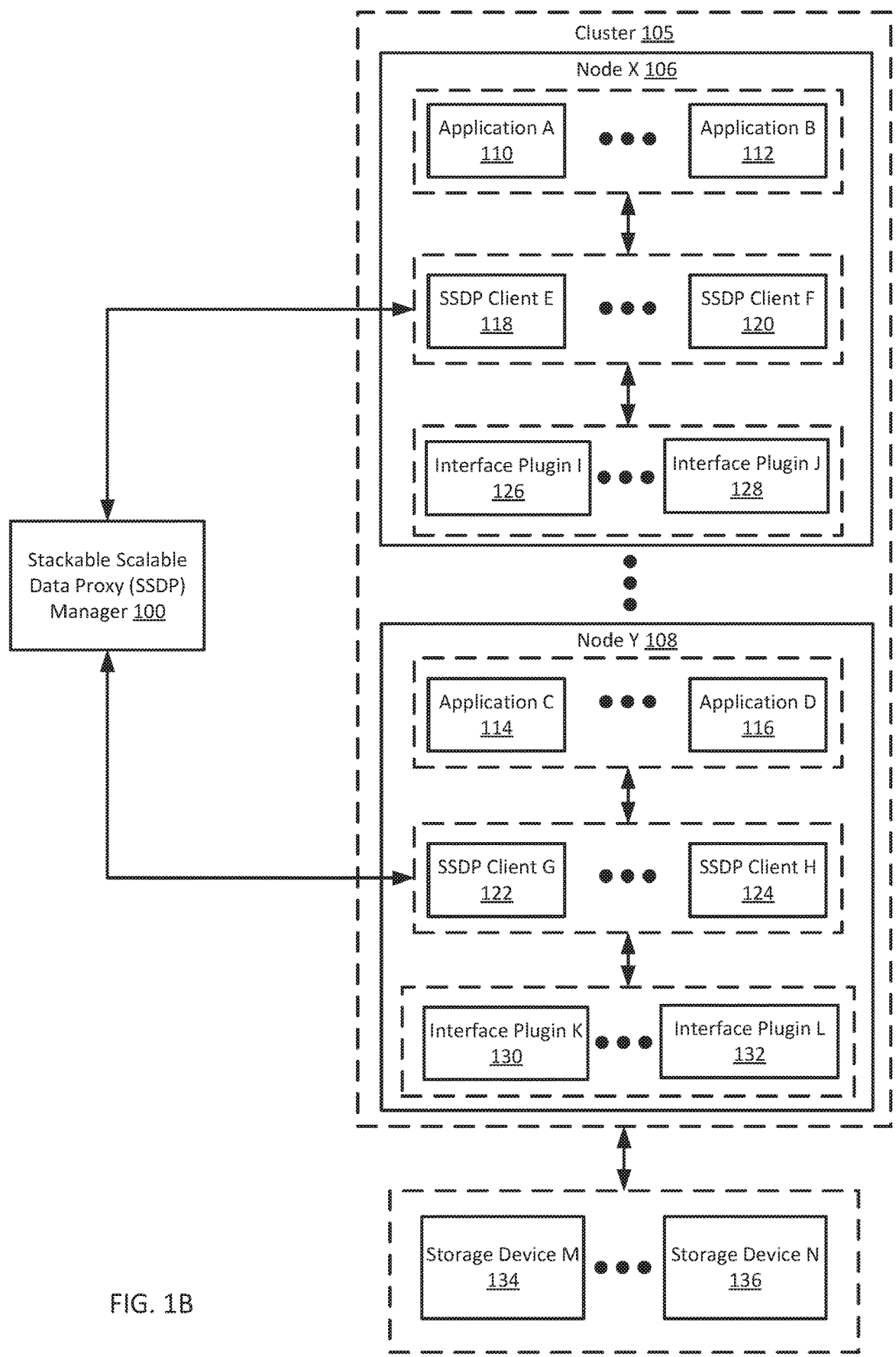
FIG. 1B shows a cluster in accordance with one or more embodiments of the invention.

FIG. 1B shows a cluster (105) in accordance with one or more embodiments of the invention. The cluster (105) is an exemplary cluster and is not intended to limit the invention.

The cluster includes multiple nodes (106X, 106Y). Each of the nodes may be implemented as a computing device (see e.g., FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The aforementioned nodes may communicate using any combination of wired and/or wireless connections and wired and/or wireless networks.

When the node is implemented as a computing device, the node may implement a single operating system (OS) (not shown). The applications (110, 112, 114, 116) may each be executing in a container (or another isolated execution environment), where the containers are executing on (or otherwise interfacing with) the OS. Said another way, the containers executing on the node share the operating system and the underlying computing resources (e.g., the processor, memory, etc.) of the computing device. In this context, the applications (110, 112, 114, 116) may be referred to as containerized applications. The applications executing in a given node may be different instances of the same application, instances of different applications, or a combination thereof. In one embodiment of the invention, the containers may be implemented using any container-based technology. Non-limiting examples of container-based technologies include, Docker, Kubernetes, and Mesos.

Continuing with the discussion of FIG. 1B, the applications (110, 112, 114, 116) may each directly interact with one or more SSDP clients (118, 120, 122, 124). However, as noted above and explained further below, the applications may indirectly utilize the functionality of other SSDP clients with which they do directly not interact (see e.g., FIGS. 2A, B). The SSDP clients communicate with the storage devices (134, 136) via a corresponding interface plugin (126, 128, 130, 132). The interface plugins may be storage-device specific. Said another way, each of the interface plugins may be developed by the vendor of the corresponding storage device. In one embodiment of the invention, the interface plugins conform to (or are otherwise consistent with) the CSI specification. The nodes may only include the interface plugs for the storage devices that are being used by the applications. Alternatively, the each node may include all interface plugins for all storage devices that are currently available regardless of whether any applications on the node are using the corresponding storage device.

Continuing with the discussion of FIG. 1B, in one embodiment of the invention, the SSDP clients within a given node may be implemented as computer instructions, e.g., computer code, stored on a persistent storage (e.g., on a node)) that when executed by a processor(s) of the node cause the node to provide the functionality of the SSDP clients. Additional detail about the SSDP clients is provided below in FIG. 1C.

In one or more embodiments of the invention, applications on a given node within a cluster may use SSDP clients on a different node within the cluster. Further, though not shown in FIG. 1B, in one or more embodiments of the invention, a set of nodes in the cluster may only include applications while other nodes in the cluster may only include SSDP clients. Other distributions of applications and SSDP clients within a cluster may be implemented without departing from the invention.

As discussed above, the SSDP manager (100) manages the configuration and operation of the SSDP clients. In one embodiment of the invention, each SSDP client mutually authenticates to the SSDP manager. Said another way, each SSDP client authenticates the SSDP manager and each SSDP manager authenticates the SSDP client. The mutual authentication for each SSDP client-SSDP manager pair may increase the security of the SSDP infrastructure.

Figure 1C:
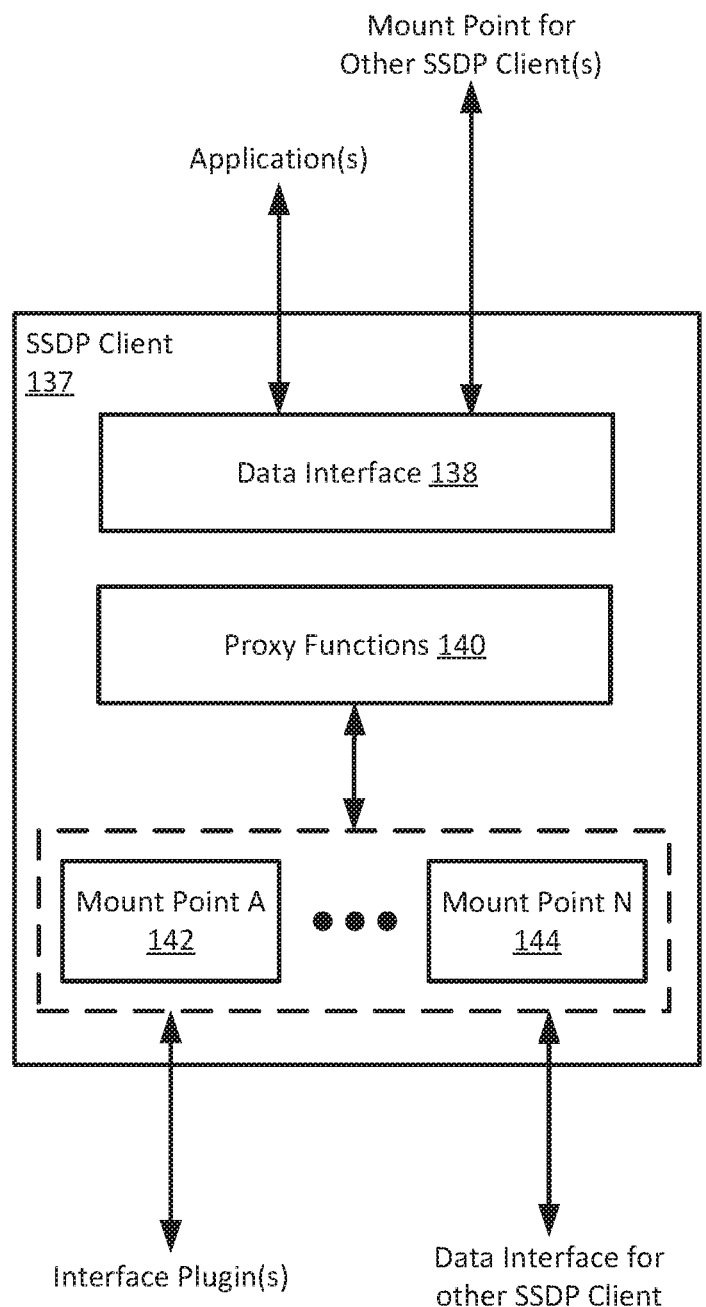
FIG. 1C shows a stackable scalable proxy manager (SSDP) client in accordance with one or more embodiments of the invention.

FIG. 1C shows a SSDP client in accordance with one or more embodiments of the invention. In one or more embodiments of the invention, the SSDP client (137) includes a data interface (138), one or more proxy functions (140), and one or more mount points (142, 144). Each of the components is described below.

In one or more embodiments of the invention, the data interface (138) in an interface that enables the SSDP client to interact with one or more applications as well as with one or more other SSDP clients. The applications (regardless of their underlying container-based technology) are able to issue input/output (IO) requests (e.g., read and write requests) to the SSDP clients. Said another way, the data interface is application agnostic.

In one embodiment of the invention, the direct interaction between an application and SSDP client may utilize clear text (i.e., not be encrypted); however, after the SSDP client processes the data associated with the IO request, the data may be encrypted. Once encrypted, the data may remain encrypted as it passes through any other SSDP clients and when it is ultimately stored in a storage device.

Continuing with the discussion of the data interface (138), as discussed above, the data interface enables the SSDP client to interact other SSDP clients. This enables the SSDP clients to be connected into a processing path (see e.g., FIG. 2B). By using a common data interface for all SSDP clients, the SSDP clients may be combined in any order/combination without requiring custom data interfaces to be developed.

Continuing with the discussion of FIG. 1C, the proxy function (140) includes any function(s) that either modifies and/or analyzes the data in order to perform an action. The proxy functions include, but are not limited to, encryption/decryption, access control, deduplication, compression, antivirus scanning, selective caching (for using in implementations in which the storage devices and/or the nodes include caches), content filtering, data identification, data merging, data splitting, data sharing, machine learning, etc.

The data that results from applying the proxy function and/or that is generated by applying the proxy function, is communicated to either another SSDP client or to an interface plugin via a mount point (142, 144). The mount points, in one or more embodiments of the invention, provide mappings to either interface plugins and/or other SSDP clients. The mappings dictate where the aforementioned data is to be sent (e.g., using the associated GUIDs, see FIGS. 3-5). Once the target of the data is determined, the data is transmitted to the target, e.g., an interface plugin associated with the storage device or a data interface of an SSDP client. The specific mechanism for transporting the data may vary based on the implementation of the invention.

Figure 2A:
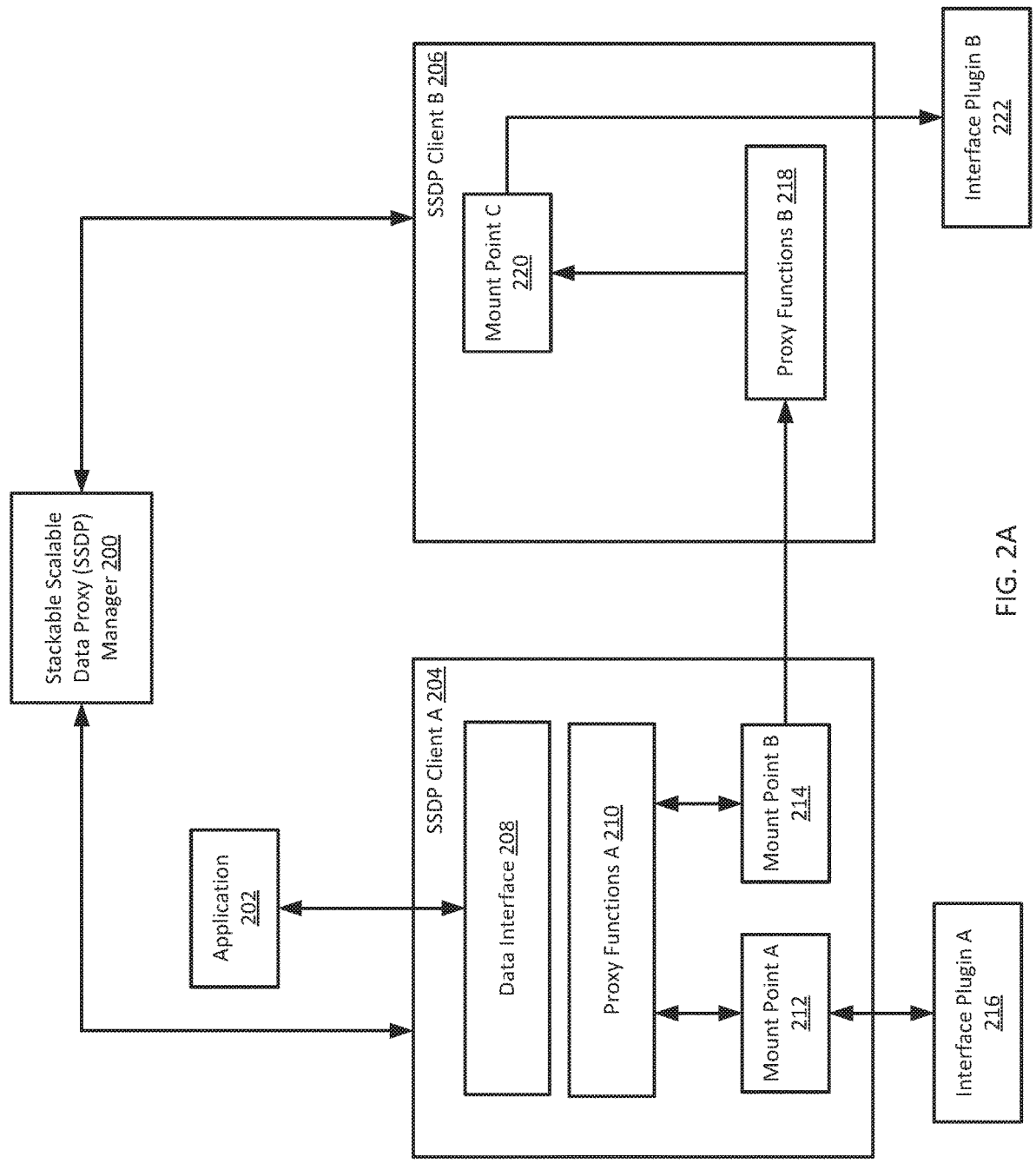
FIG. 2A shows an exemplary horizontally configuration of SSDP clients in accordance with one or more embodiments of the invention.

Though not shown in FIG. 1C, there may be scenarios in which a mount point may be directly mapped to a proxy function, when the SSDP clients are implementing horizontal scaling (see e.g., FIG. 2A).

FIG. 2A shows an exemplary horizontally configuration of SSDP clients in accordance with one or more embodiments of the invention. In one embodiment of the invention, horizontal scaling of SSDP clients may be implemented in scenarios in which the data is to be modified (e.g., encrypted) as well as analyzed in order to perform an action (e.g., logging). The following is a non-limiting example of horizontal scaling using SSDP clients. The example is not intended to limit the scope of the invention. For purposes of this example, various elements of SSDP Client B have been omitted in FIG. 2A for clarity.

Turning to FIG. 2A, consider a scenario in which the data from an application (202) is to be encrypted and stored (in an encrypted form) in a storage device associated with interface plugin A (216) and the IO request is to be logged where the log entry is to be stored in a storage device associated with interface plugin B (220).

In this example, the application (202) sends an IO request to SSDP client A (204). The IO request is received by a data interface (208). The data interface provides the IO request to the proxy function A (210), which includes functionality to encrypt data. Proxy function A (210) encrypts the data using an appropriate encryption key obtained from the SSDP manager (see e.g., FIGS. 3-5). The encrypted data is then provided to mount point A (212), which subsequently transmits the encrypted data to interface plugin A (216). Interface plugin A then facilitates the storage of the encrypted data in a corresponding storage device (not shown). Proxy function A also sends unencrypted data, via mount point B (214) to proxy function B (218) in SSDP client B (206). Proxy function B (218) generates a log entry based on the received data and then sends the generated log entry to interface plugin B (220) via mount point C (220). Interface plugin B then facilitates the storage of the log entry in a corresponding storage device (not shown).

Figure 2B:
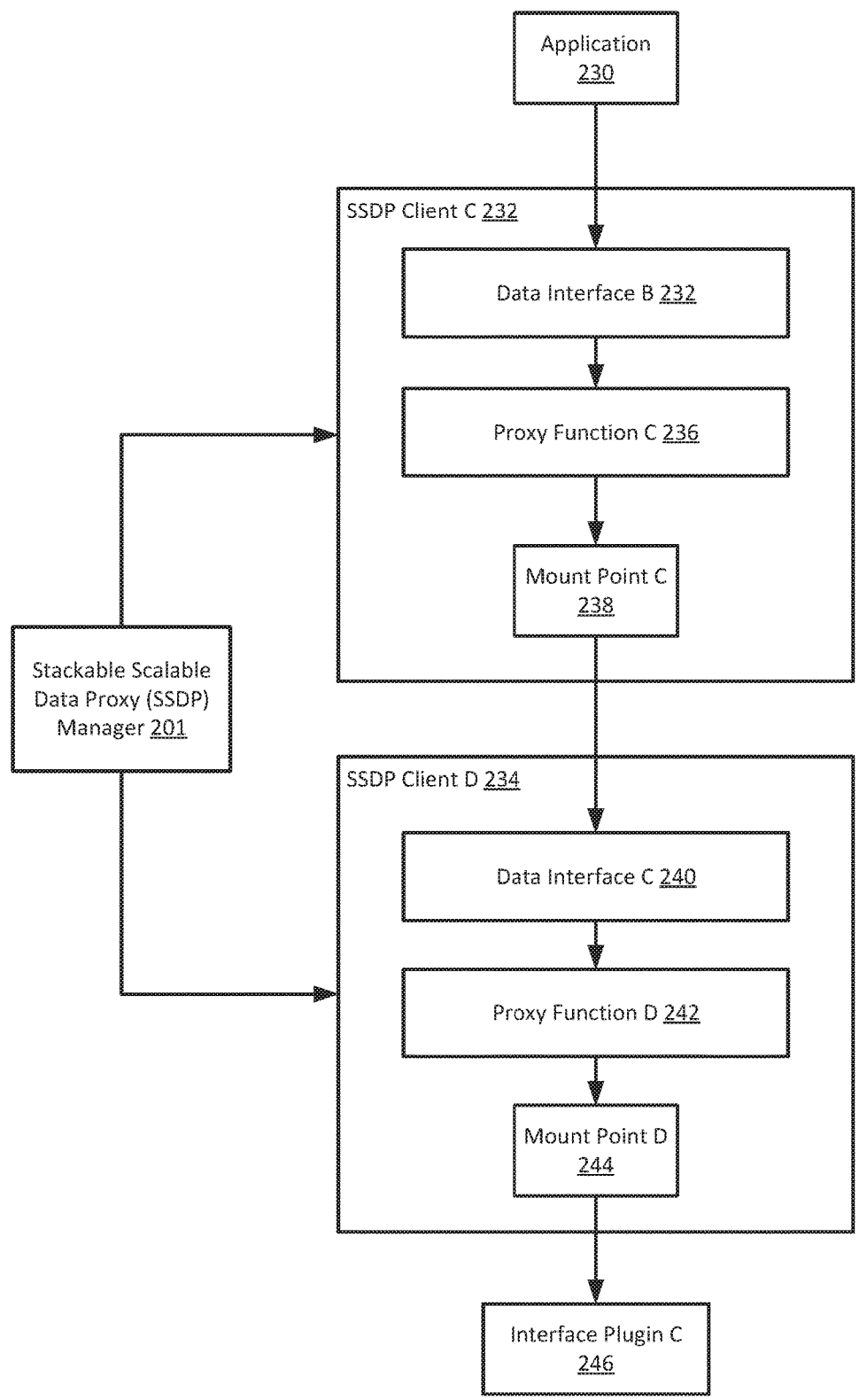
FIG. 2B shows an exemplary vertical configuration for SSDP clients in accordance with one or more embodiments of the invention.

FIG. 2B shows an exemplary vertical configuration for SSDP clients in accordance with one or more embodiments of the invention. In one embodiment of the invention, vertical scaling of SSDP clients may be implemented in scenarios in which the data is to be modified (e.g., encrypted and compressed) via sequential processing of the data. The following is a non-limiting example of vertical scaling using SSDP clients. The example is not intended to limit the scope of the invention.

Turning to FIG. 2B, consider a scenario in which the data from an application (230) is to be encrypted and the encrypted data is then compressed (i.e., a compression algorithm is applied to the encrypted data) with the resulting compressed encrypted data being stored in a storage device.

In this scenario, the application (230) sends, in clear text, data as part of the IO request, to SSDP client C (232). The IO request (and associated data) are received by data interface B (232). The data is then passed to Proxy Function C (236), which encrypts the data using an encryption key obtained from the SSDP manager (201). The encrypted data is then transmitted to SSDP Client D (234) via mount point C (238) and data interface C (240). Proxy function D (242) subsequently receives the encrypted data from data interface C (240) and then applies a compression algorithm to the encrypted data to generate compressed encrypted data. The compressed encrypted data is then sent to the mount point D (244). Mount point D, using the mapping maintained therein, transmits the compressed encrypted data to interface plugin C (246). Interface plugin C then facilitates the storage of the compressed encrypted data in a corresponding storage device (not shown).

Figure 3:
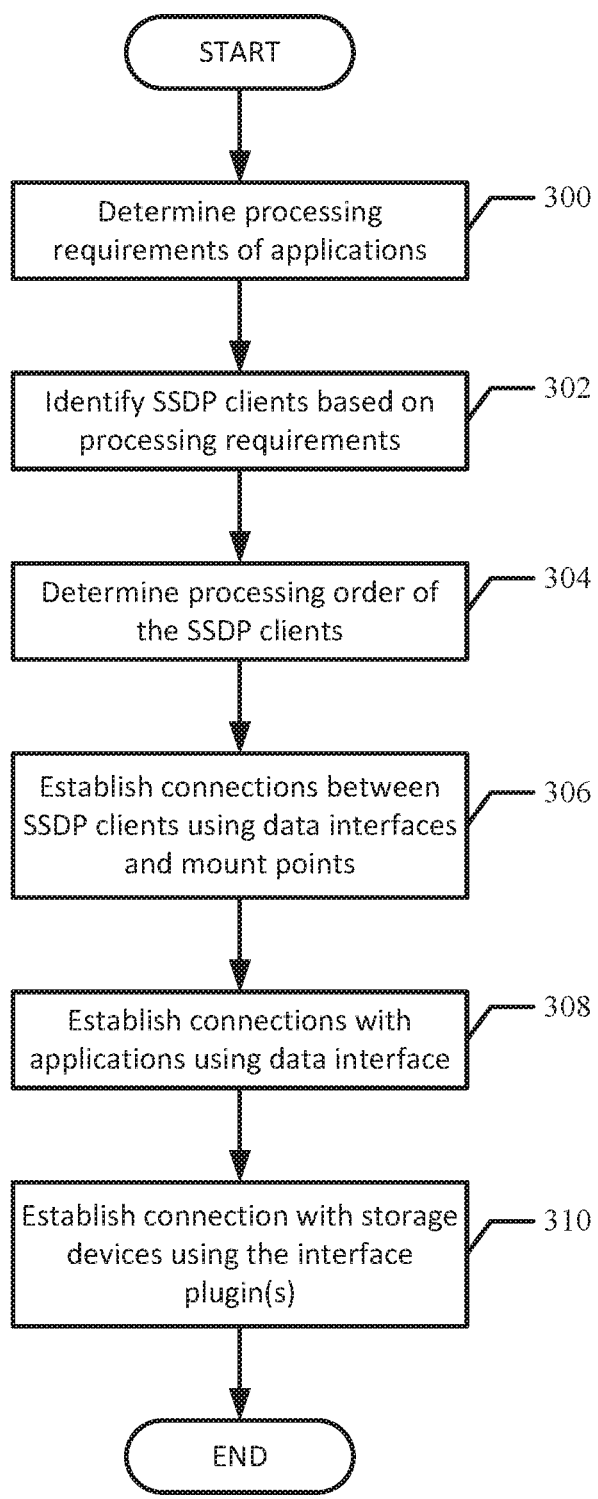
FIG. 3 shows a method in accordance with one or more embodiments of the invention.
Figure 4:
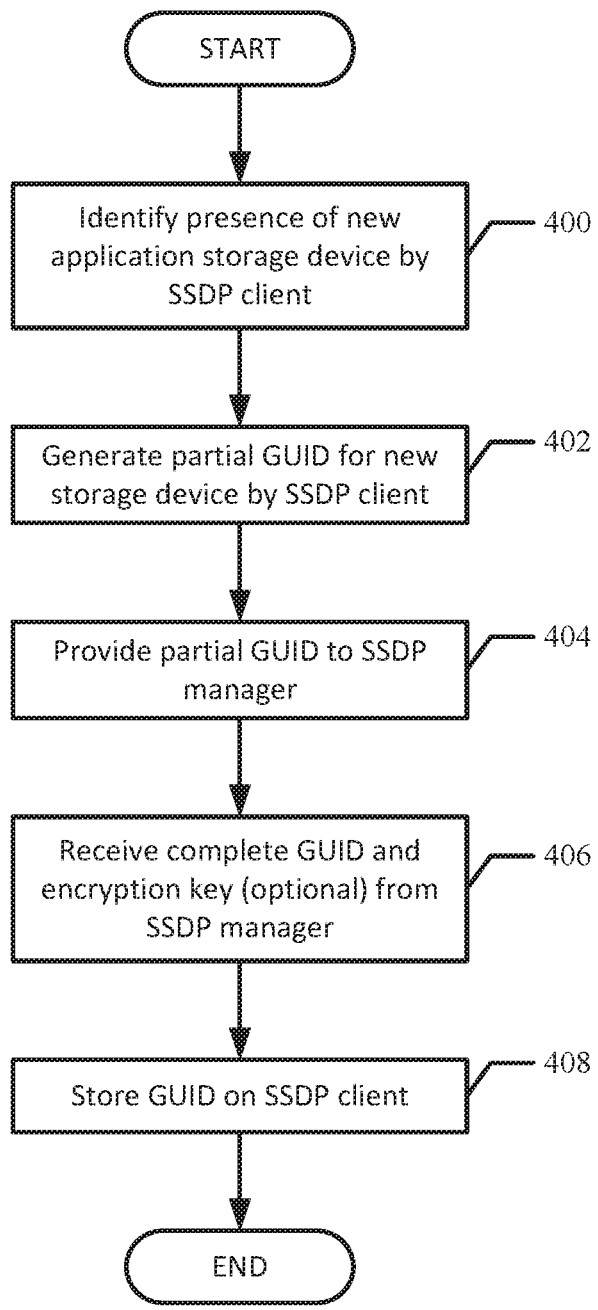
FIG. 4 shows a method in accordance with one or more embodiments of the invention.

FIGS. 3-5 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3-5 may be performed in parallel with any other steps shown in FIGS. 3-5 without departing from the scope of the invention.

FIG. 3 shows a method in accordance with one or more embodiments of the invention. More specifically, FIG. 3 shows a method for creating a processing path using SSDP clients. The method shown in FIG. 3 may be performed, for example, by a SSDP manager.

Turning to FIG. 3, in step 300, the processing requirements of the applications are obtained. The processing requirements may include the type of modifications and/or analysis that is to be performed on the data from the applications. The processing requirements may specify the order in which the various modifications and/or analysis of the data is to be performed as well as any other specific requirements for the processing. For example, a processing requirement may be that the data is to be encrypted using a particular encryption algorithm with a key of a particular encryption key length.

In step 302, one or more SSDP clients are identified based on processing requirements. In one embodiment of the invention, the SSDP manager may maintain a SSDP client registry, which specifies the SSDP clients that are available and their specific characteristics (e.g., what proxy function(s) each SSDP client implements). The SSDP manager may identify the specific SSDP clients to use based on the processing requirements and the SSDP client registry.

In step 304, the processing order of the SSDP clients is determined. Specifically, the SSDP manager determines a proposed order of SSDP clients based on the processing requirements.

In step 306, a connection(s) is established between the SSDP clients using data interfaces and mount points in accordance with the processed ordering. For example, consider a scenario in which the SSDP client order from Step 304 is: [SSDP client A, SSDP client B]. In this example, the mount point in SSDP client A is connected to the data interface on SSDP client B. In one embodiment of the invention, establishing a connection includes generating a mapping between SSDP client A and SSDP client B, where the mapping is maintained in the mount point of SSDP client A.

In step 308, a connection is established with applications using the data interface of the SSDP client. Continuing with the example in step 306, the application is mapped to the data interface of SSDP client A, such that it can transmit data to the data interface of SSDP client A.

In step 310, a connection is established with storage devices using the interface plugin. As discussed above, the SSDP manager maintains a data structure that specifies the storage devices that are accessible to the SSDP clients. Accordingly, in step 310, the SSDP manager may, with or without input from a user of the application (i.e., the application associated with the processing requirements in step 300), identify the appropriate storage device on which to store the data from the application based, e.g., on a storage policy maintained by the SSDP manager. Once the storage device is identified, the SSDP manager connects a mount point in the appropriate SSDP client to an interface plugin that is associated with the storage device selected by the SSDP manager.

In another embodiment of the invention, the application specifies the storage device to use to store its data and provides this information to the SSDP manager. The SSDP manager subsequently connects a mount point in the appropriate SSDP client to an interface plugin that is associated with the storage device selected by the application.

In one embodiment of the invention, establishing a connection includes generating a mapping between mount point and the interface plugin, where the mapping is maintained in the mount point.

FIG. 4 shows a method in accordance with one or more embodiments of the invention. The method shown in FIG. 4 may be performed, for example, by a SSDP client. The method shown in FIG. 4 is used to identify new storage devices and/or new storage volumes on an previously identified storage device that are now available to store data from applications. The method shown in FIG. 4 may be performed after the method shown in FIG. 3 has been performed.

Turning to FIG. 4, in step 400, the presence of a new storage device (or storage volume) is identified by the SSDP client. In one or more embodiments of the invention, the SSDP client receives a message via an interface plugin that indicates the presence of a storage device (or storage volume). The message may also specify the characteristics of the new storage device (or storage volume) such as storage type, storage class, and capacity.

In step 402, a partial GUID is generated for the new storage device (or storage volume) by the SSDP client. In one or more embodiments of the invention, the partial GUID is a numeric or alpha numeric value that is generated using, e.g., storage volume information and/or cluster information. Storage volume information may include, but is not limited to, storage type, storage class, storage device ID, storage object/block ID, network storage IP address, volume path, and/or file system path. Cluster information may include, but is not limited to, cluster name, cluster ID, cluster master IP addresses, cluster location, and/or datacenter location.

In step 404, the partial GUID is provided to the SSDP manager by the SSDP client along with the characteristics of the new storage device (or storage volume). In one of more embodiments, the SSDP manager is responsible for generating the complete GUID. The complete GUID may include the partial GUID or be based on the partial GUID. The GUID uniquely identifies the new storage device (or storage volume) relative to all other storage devices (or storage volumes) managed by the SSDP manager.

The SSDP manager may store the GUID along with characteristics of the new storage device (or storage volume). The SSDP manager may also generate and store one or more encryption keys for the new storage device (or storage volume). For example, the SSDP manager may generate a single encryption key for the new storage device (or storage volume) or it may generate multiple encryption keys for the new storage device (or storage volume) for implementations in which there is, e.g., file level encryption within the new storage device (or storage volume).

Further, in one or more embodiments of the invention, the SSDP manager may store a mapping between the GUID and one or more applications. In these scenarios, the data associated with the one or more applications will be stored in the new storage device (or storage volume) associated with the GUID. The mapping of GUID to application may be generated and stored at a later point in time.

In step 406, the SSDP client receives the GUID and, optionally, the encryption key(s) from SSDP manager. The SSDP client may maintain the encryption keys in volatile storage and not persistently store the encryption keys. Further, another embodiment of the invention, the SSDP client may only receive the GUID.

In step 408, the GUID is stored on the SSDP client (i.e., the SSDP client that triggered the step 400). In addition, the GUID may also be stored in other SSDP clients that are connected (see e.g., FIG. 3) to the SSDP client. In addition, if the SSDP client is associated with an application (e.g., as discussed in FIG. 3), then the SSDP client may include a mapping of GUID to application. The mapping of GUID to application may be maintained by all SSDP clients that are processing data for a given application. Further, if the application is storing data in multiple storage devices (or storage volumes) (see e.g., FIG. 2A), then the SSDP clients may include the appropriate mappings between GUID and application as well as the corresponding functionality (which may be implemented as computer readable instructions) to use the appropriate mappings such that the data is stored in the appropriate storage devices (or storage volumes). In one embodiment of the invention, the SSDP client may also store the GUID in the new storage device (or storage volume).

In embodiments in which the encryption key is provided to the SSDP client, the SSDP client may temporarily store the encryption key.

FIG. 5 shows a method in accordance with one or more embodiments of the invention. The method shown in FIG. 5 may be performed, for example, by a SSDP client(s). More specifically, FIG. 5 shows a method for processing an IO request from a containerized application.

Turning to FIG. 5, in step 500, an IO request is received from a containerized application. The IO request may be a read request or a write request. The IO request specifies the type of request (e.g., a read or write) as well as information about the application that issued the request and the data (e.g., file name) that is the target of the IO request. If the request is a read request, then the read request may include a file name (or another reference or identifier) of the file. If the request is a write request, the request may include the file and/or the file name. The specific implementation of the IO requests may vary without departing from the invention.

In step 502, the SSDP client sends an access request that includes a GUID associated with the IO request to the SSDP manager. In one embodiment of the invention, the SSDP client maintains a mapping of application information (e.g., application name and/or other information that may identify the application) along with a GUID(s) assigned to the application. The GUID(s) may be assigned to the application in accordance with the method described above with respect to FIG. 4.

The SSDP client uses the application information in the IO request along with the application information to GUID mapping to identify the GUID(s) associated with the IO request. The SSDP client then generates and issues an access request that includes the identified GUID as well as other information to the SSDP manager. The other information may include, but is not limited to, application information and information about the target of the IO request (e.g., the file name).

In step 504, the SSDP client receives a response from the SSDP manager. In one or more embodiments of the invention, the SSDP manager may permit or deny access to the target of the IO request according to predefined security and/or application control policies. For example, upon receipt of the access request from the SSDP client, the SSDP manager may extract the GUID and then determine whether the containerized application may access the target file (i.e., the file specified in the IO request) based on an access control list(s) (ACLs). The SSDP manager may maintain an ACL(s) that maps access policies (or rules) to GUIDs. The granularity of the mapping may vary based on the implementation. For example, an ACL may be implemented on a per-storage device level, on a per-storage volume level, or on a per-file level.

If the application is permitted to access the target of the IO request, then the SSDP manager sends back an access response that indicates that the SSDP client may proceed with the processing of the IO request. Alternatively, if the application is not permitted to access the target of the IO request, then the SSDP manager sends back an access response that indicates that the SSDP client may not proceed with the processing of the IO request.

Depending on the implementation of the invention, the target of the IO request may be encrypted and/or may need to be encrypted. In these scenarios, the access response (for scenarios in which access is permitted) also includes the encryption (or decryption key) as well as any other information required for encryption (or decryption).

If the access response indicates access is permitted the process proceeds to step 506; otherwise, the process ends.

In step 506, the IO request is then processed by the SSDP client(s). The specific processing of the IO request may vary based how many SSDP clients are interposed between the application and the interface plug (which ultimately connects to the storage device). In general, the IO request (which may or may not include associated data depending on the IO request) is processed by the proxy function in the SSDP client that is directly communicating with the application. The result of the processing may be sent (via the mount point) to either another SSDP client and/or to an interface plugin. Regardless of where the result is sent, the mount point on the SSDP client includes a mapping between GUID and target (which may be an SSDP client and/or an interface plugin). The mapping may be previously specified when performing FIG. 3. In such scenarios, the mount point receives the GUID, an IO request (or information related to the IO request) and, optionally, data (which may or may not be modified by the proxy function). The mount point uses the GUID in combination with the aforementioned mapping to determine the target of the IO request (or information related to the IO request) and, optionally, data (which may or may not be modified by the proxy function). Once the target is determined, the IO request (or information related to the IO request) and, optionally, data (which may or may not be modified by the proxy function) are transmitted to the target. The aforementioned process may be repeated until the target is an interface plugin. Once the IO request is serviced by the storage device, the response to IO request (which may be notification that data is written to the storage device or data that is being read from the storage device) may be transmitted back to the application along with same path (but in the reverse direction) to the application.

EXAMPLE

The following section describes a non-limiting example is accordance with one or more embodiments of the invention. The example is not intended to limit the scope of the invention.

Turning to the example and referring to FIG. 2B, consider a scenario in which a write request with data is issued to SSDP client C (232) from the application (230). SSDP client C receives the IO request and determines that the IO request originated from the application. SSDP client C then determines a GUID associated with the IO request using information about the application (i.e., the application that originated the IO request). The GUID is then used to generate an access request, which is then sent by SSDP client C to the SSDP manager (201).

SSDP manager analyses the access request and determines that the application is permitted to perform the IO request. Further, the SSDP manager, using the GUID, obtains an encryption key. The SSDP manager sends back an access response, which indicates that the IO request is permitted to be processed. The SSDP manager also provides the encryption key to SSDP client C.

Proxy Function C (236) in SSDP client C encrypts the data using the encryption key and then sends the encrypted data along with the GUID to Mount Point C (238). Mount Point C uses the GUID to determine that the encrypted data is to be transmitted to SSDP Client D (234). SSDP client C subsequently transmits the encrypted data to Data Interface C (240) of SSDP client D (234).

Data Interface C (240) sends the encrypted data to Proxy Function D (242), which in this example, implements a compression algorithm. Accordingly, Proxy Function D compresses the encrypted data to generate compressed encrypted data and then sends the compressed encrypted data along with the GUID to Mount Point D (244). Mount Point D uses the GUID to determine that the compressed encrypted data is to be transmitted to Interface Plugin C (246). SSDP client D subsequently transmits the compressed encrypted data to Interface Plugin C (246).

End of Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612)(e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s)(602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing data, comprising:
   receiving, via a unified data interface, a request from a containerized application;
   determining an identifier associated with the request;
   processing the request using at least one proxy function to generate an output, wherein processing the request comprises:
      sending the identifier to a Stackable Scalable Data Proxy (SSDP) manager;
      receiving, from the SSDP manager, an encryption key; and
      wherein the output is generated, at least in part, using the encryption key; and
   transmitting, via an interface plugin, the output to a storage device, wherein the storage device is associated with the identifier;
   prior to receiving the request:
      identifying, via the interface plugin, the storage device;
      generating a portion of the identifier using local environment information;
      providing the portion of the identifier to the SSDP manager, wherein the SSDP manager generates the identifier using the portion of the identifier; and
      receiving the identifier from the SSDP manager.

2. The method of claim 1,
   wherein processing the request using the at least one proxy function to generate the output comprises:
      processing data associated with the request using a first proxy function to generate an intermediate output; and
      processing the intermediate output using a second proxy function to generate the output,
   wherein the first proxy function is associated with a first SSDP client and the second proxy function is associated with a second SSDP client.

3. The method of claim 2,
   wherein the first proxy function provides the intermediate output to a first mount point,
   wherein the first mount point is mapped to a second data interface of the second SSDP client,
   wherein the second SSDP client receives the intermediate output from the second data interface.

4. The method of claim 1,
   wherein processing the request using the at least one proxy function to generate the output comprises:
      processing data associated with the request using a first proxy function to generate the output,
      processing the request using a second proxy function to generate a second output, wherein the first proxy function is associated with a first SSDP client and the second proxy function is associated with a second SSDP client.

5. The method of claim 4,
wherein the first proxy function provides the data to a first mount point,
wherein the first mount point is mapped to a second data interface of the second SSDP client,
wherein the second SSDP client receives the data from the second data interface, wherein the second SSDP client generates the second output using, at least in part, the data.

6. The method of claim 5, wherein the first proxy function modifies the data to generate the output, wherein the second proxy function generates a log entry based on the data.

7. The method of claim 1, wherein the identifier uniquely identifies at least a portion of the storage device.

8. The method of claim 1, wherein determining the identifier comprises using a containerized application to identifier mapping.

9. The method of claim 1, wherein sending the identifier to the SSDP manager also comprises:
sending application information associated with the containerized application to the SSDP manager.

10. The method of claim 9, wherein the at least one proxy function is associated with a SSDP client, wherein the SSDP client mutually authenticates with the SSDP manager prior to sending the identifier and the application information to the SSDP manager.

11. The method of claim 1, wherein the interface plugin supports a common container storage interface (CSI) specification.

12. The method of claim 1, further comprising:
receiving, via the unified data interface, a second request from a second containerized application;
determining a second identifier associated with the second request;
processing the second request using that at least one proxy function to generate a second output; and
transmitting, via a second interface plugin, the second output to a second storage device, wherein the second storage device is associated with the second identifier.

13. The method of claim 1, further comprising:
receiving, via the unified data interface, a second request from a second containerized application;
determining a second identifier associated with the second request;
processing the second request using that at least one proxy function to generate a second output; and
transmitting, via a second interface plugin, the second output to the storage device, wherein the storage device is associated with the second identifier.

14. A non-transitory computer readable medium (CRM) storing instructions, which when executed by at least one processor performs a method, the method comprising:
receiving, via a unified data interface, a request from a containerized application;
determining an identifier associated with the request;
processing the request using at least one proxy function to generate an output, wherein processing the request comprises:
sending the identifier to a Stackable Scalable Data Proxy (SSDP) manager;
receiving, from the SSDP manager, an encryption key; and
wherein the output is generated, at least in part, using the encryption key; and
transmitting, via an interface plugin, the output to a storage device, wherein the storage device is associated with the identifier;
prior to receiving the request:
identifying, via the interface plugin, the storage device;
generating a portion of the identifier using local environment information;
providing the portion of the identifier to the SSDP manager, wherein the SSDP manager generates the identifier using the portion of the identifier; and
receiving the identifier from the SSDP manager.

15. The CRM of claim 14, wherein the method further comprises:
wherein processing the request using the at least one proxy function to generate the output comprises:
processing data associated with the request using a first proxy function to generate an intermediate output; and
processing the intermediate output using a second proxy function to generate the output,
wherein the first proxy function is associated with a first SSDP client and the second proxy function is associated with a second SSDP client.

16. The CRM of claim 15, wherein the method further comprises:
wherein the first proxy function provides the intermediate output to a first mount point,
wherein the first mount point is mapped to a second data interface of the second SSDP client,
wherein the second SSDP client receives the intermediate output from the second data interface.

17. The CRM of claim 14, wherein the method further comprises:
wherein processing the request using the at least one proxy function to generate the output comprises:
processing data associated with the request using a first proxy function to generate the output,
processing the request using a second proxy function to generate a second output,
wherein the first proxy function is associated with a first SSDP client and the second proxy function is associated with a second SSDP client.

* * * * *